United States Patent [19]
Harmon

[11] 3,774,869
[45] Nov. 27, 1973

[54] COMBINED THROTTLE SPOILER ACTUATOR FOR AIRCRAFT

[76] Inventor: Kenneth N. Harmon, P.O. Box 1201, Kerrville, Tex. 78028

[22] Filed: Mar. 7, 1972

[21] Appl. No.: 232,388

[52] U.S. Cl.................. 244/83 R, 74/491, 74/567
[51] Int. Cl............................................. B64c 13/04
[58] Field of Search.............. 244/83 R, 83 C, 42 D, 244/75 R, 76 R; 74/469, 471 R, 491, 496, 74/497, 567, 569

[56] References Cited
UNITED STATES PATENTS

| | | | |
|---|---|---|---|
| 2,071,063 | 2/1937 | Florez et al...................... | 244/42 D |
| 2,450,709 | 10/1948 | Beman............................. | 244/75 R |
| 2,501,726 | 3/1950 | Knox................................ | 244/42 D |
| 2,871,723 | 2/1959 | Shephard............................. | 74/567 |
| 3,057,221 | 10/1962 | Smith................................ | 74/471 X |
| 3,085,447 | 4/1963 | Shay.................................. | 74/471 R |

Primary Examiner—Milton Buchler
Assistant Examiner—Barry L. Kelmachter
Attorney—Willard J. Hodges, Jr.

[57] ABSTRACT

A mechanical multiple linkage cam controlled manually powered handle and arm activated mechanism for progressively retarding the throttle to neutral deploying simultaneously a spoiler and dive brake in a progressive action to reduce the lift of the airfoil thereby increasing the rate of descent without substantially increasing the air speed. After landing, a further movement of the control arm to the rear advances the throttle. At any stage of progressive movement of the combined linkage, the rapid advance of the arm and throttle arm forward to the full power position simultaneously retracts the spoiler and dive brake to restore maximum lift simultaneously with the application of maximum power.

10 Claims, 4 Drawing Figures

COMBINED THROTTLE SPOILER ACTUATOR FOR AIRCRAFT

BACKGROUND OF THE INVENTION

1. Field of the Invention

This invention pertains to a manually actuated, manually powered mechanical linkage in conjunction with a cam controlled mechanism for single lever control of throttle spoiler and dive brake on a general purpose aircraft. In recent years, some attempts have been made, particularly by NASA and various research organizations to develop an effective spoiler mechanism manually operated for utilization in conjunction with light general purpose aircraft. The device of this invention is designed to provide a simplified control by a single arm to control the throttle as well as deploying the spoiler and dive brake. The method of use and operation is identical with the present lever controlled throttles whereby movement of the control handle forward advances the throttle and pull to the rear retards the throttle. This throttle control function is a combined mechanism whereby spoilers are deployed after the throttle is retarded; further retracting of the throttle deploys a spoiler dive brake combination.

2. DESCRIPTION OF THE PRIOR ART

Utilization of spoilers is quite common in jet transport aircraft. The frequent method of operation and control is to combine a contact switch and a hydraulically controlled mechanism with the landing gear which results in extremely rapid deployment of the spoilers on contact of the landing gear with the runway. This immediately kills the lift of the wing of the jet transport aircraft. Spoilers have heretofore been used to a very limited extent in light or general purpose aircraft. Spoilers are universally used on sail planes to reduce lift and increase the degree of accuracy in landing. The skill with which a glider pilot maneuvers his plane to the desired landing point is a source of envy to many light plane pilots. The development of the spoiler and dive brake applications to general purpose aircraft prompted your inventor's conceiving and developing this invention. Some developments have heretofore been made in single lever controls which normally have been interlocking controls or spring loaded linkages to combine throttle and spoiler deployment mechanisms.

SUMMARY OF THE INVENTION

A desire to develop a single handle and arm mechanism for effectively combining throttle, spoiler, and dive brake controls prompted your inventor in making this invention. Safety requirements as well as demands to afford a natural throttle operation for wave-off go-around situations in landing approach techniques also prompted your pilot-engineer in developing this invention. A delicate balance between the dive brake and frontal area of the spoiler is balanced through a direct linkage which permits manual operation of the device. A throttle-like handle arm linkage, operating through a triangular cam mechanism, employing cam followers and various arms and linkages apply full throttle in a coordinated progressive manner. The cam linkage progressively retard the throttle and deploy as desired spoiler and dive brake increase the rate of descent enabling the user pilot to more accurately land at the exact desired spot on the runway.

One object of the invention was to provide a single lever control progressively interlinking throttle and spoiler deployment mechanism. Another object was to permit a rapid complete deployment of spoilers upon landing to kill the lift of the airfoil. Once landed, a further progressive movement of the handle arm mechanism will advance the taxi throttle. Should an emergency arise in an approach situation wherein the pilot desires to go around, a smooth advance of the throttle will close the spoilers and dive brakes providing maximum lift to the airfoil followed by a progressive application of maximum power to the engine.

BRIEF DESCRIPTION OF THE DRAWINGS

For a description of the construction and operation of the device, your attention is invited to the attached several views wherein identical reference characters will be utilized to refer to the various components throughout the various views and the following detailed description of the preferred embodiment.

DESCRIPTION OF THE PREFERRED EMBODIMENT

Figure 1:
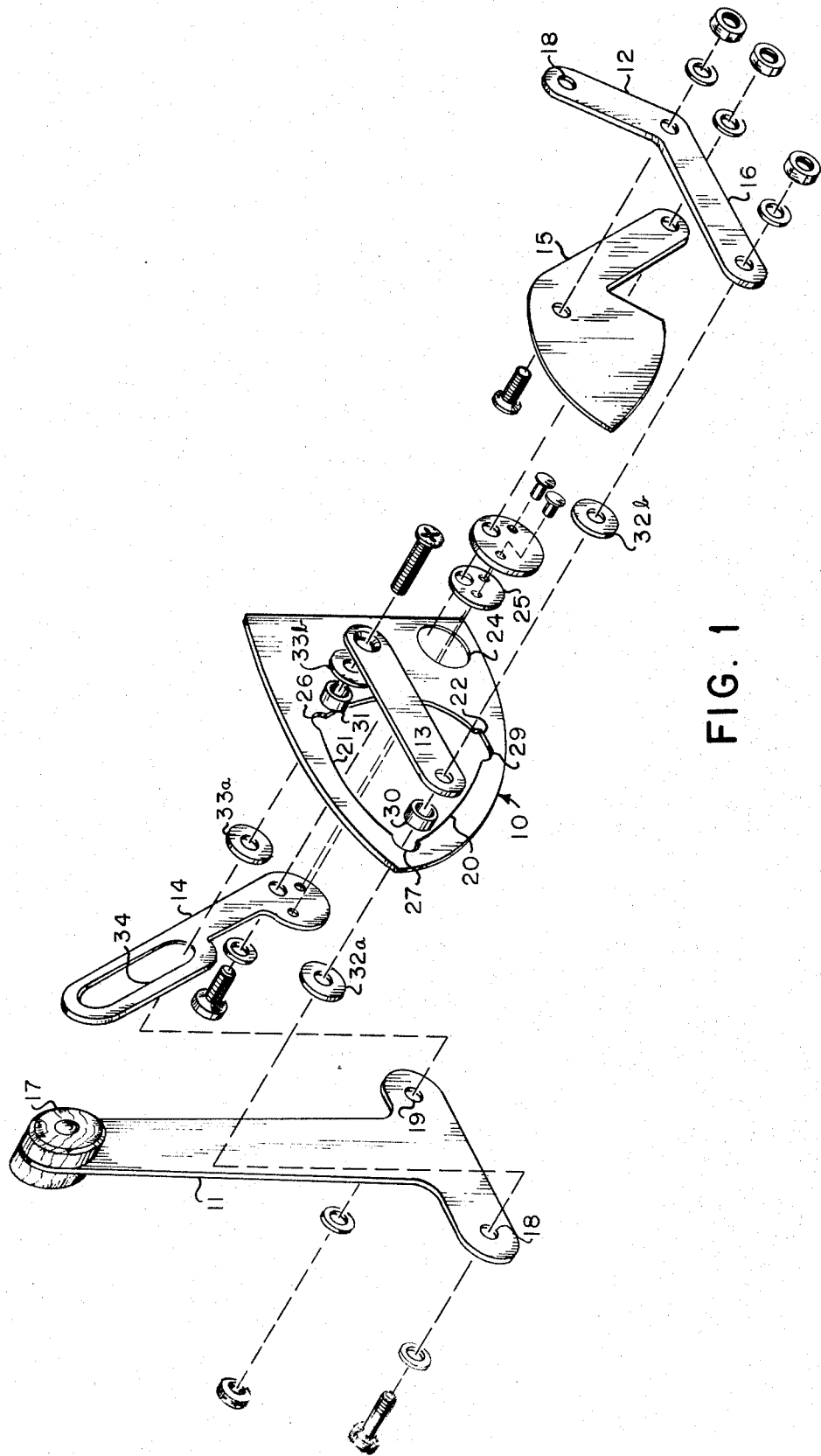
FIG. 1 is an exploded view of the operating handle and the arms and linkages assembled around the triangular-lke cam which comprises the salient inventive features of this invention.
Figure 2:
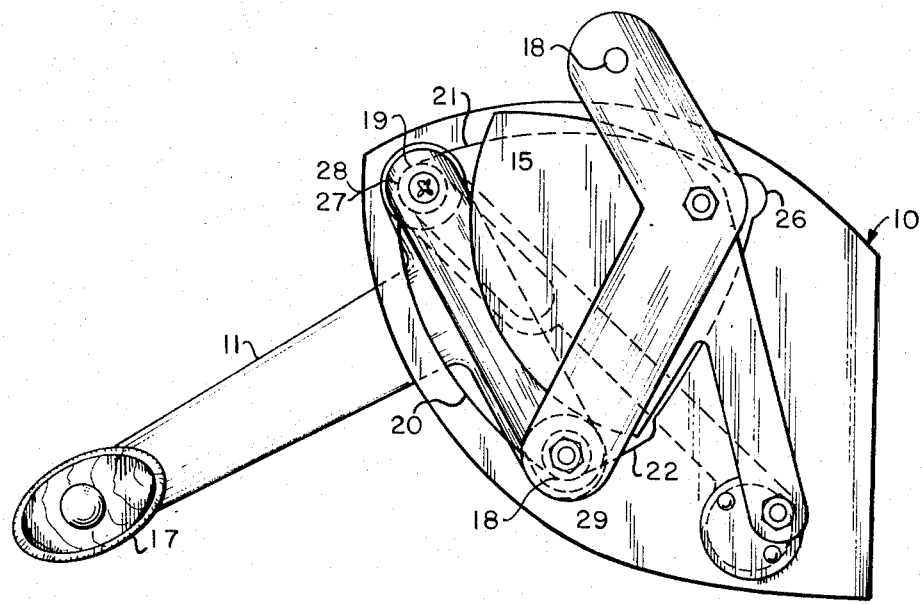
FIG. 2 is a right side view of the assembled combined control device as it would normally be positioned in an aircraft.
Figure 3:
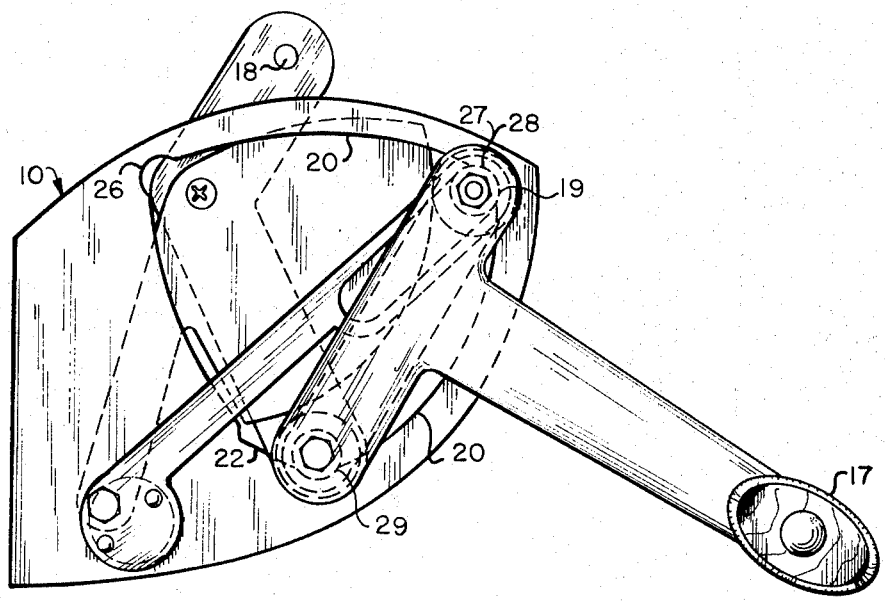
FIG. 3 is the opposite or left side view of the device in the assembled configuration.

For a description of the preferred embodiment, your attention is invited to the attached various views. The basic mechanism of this invention comprises an equilateral triangular cam 10 structure. In the preferred embodiment, this cam member 10 was machined in a piece of aluminum stock one-eighth inch thick. An equilateral triangle 3.062 inches on each side was laid out utilizing the corners of the triangle as centers arcs of 3.250 inches were subscribed to be machined as the cam surfaces. Outward from each corner of the triangle at a radius of 0.25 inches detents were subscribed and consturcted. This triangular cam mechanism 10 is the central basis for this device. The device is actually operated by arm 11 which is mounted in cam 10 on two one-half inch outside diameter bearings mounted three inches apart. On the opposite side of cam 10 is assembled the bearing support strap 13 mechanism. These components would comprise an operable functionable linkage; however, in the device of this invention to improve operating characteristics, a progressive throttle control idle arm 14 is pivotally mounted on cam 10 and attached to idle plate 15. The upper half of this angular member is designated as the throttle arm 12 and the lower half is designated as taxi arm 16. An actuator handle 17 is secured to the end of arm 11. The device incorporates a throttle attach point 18 and a spoiler attach point 19 adjacent arm 11. The various arcuate surfaces of cam 10 are designated as throttle cam 20, spoiler cam 21, and the short cam surface is taxi cam 22. The basic cam 10 might be secured in various manners; however, in the illustrated preferred embodiment, a cam bracket 23 was employed. Idle arm 14 is pivotally secured to cam 10 in the circular idle arm mount 24 a bearing surface or idle pivot 25 is mounted in the recess. The combined structure would not function and operate without machining the heretofore referred recesses at each corner of the equilateral triangular cam 10 structure. These recesses are defined as spoiler close detent 26, throttle on detent 27, and spoiler open detent 28, and throttle retard detent 200. As best illustrated in FIG. 1, the cam followers ride on and bear against the inner surface of cam 10. these are designated as throttle cam follower 30 and spoiler cam follower 31. These followers are of a reduced diameter and of a thickness to be compatible with the materials utilized in constructing cam 10. Followers 30 and 31 are partially retained in position by throttle cam washers 32 and spoiler cam washers 33. Constructed in idle arm 14 is a throttle retard slot 34. The combined function of idle arm 14 in conjunction with the relative position of idle pivot 25 assist in accomplishing of a progressive retarded idle throttle coordinated with spoiler deployment. Throttle cable 35 is attached to throttle arm 12 at throttle attach point 18. spoiler push rod 36 is pivotally secured to arm 11 at spoiler attach point 19. Perhaps the most novel structure of this invention is the equilateral triangle cam 10 in conjunction with the linkage components and cam followers 30 and 31 heretofore described. Utilization of this combination in the overall configuration of an aircraft will now be further described.

Figure 4:
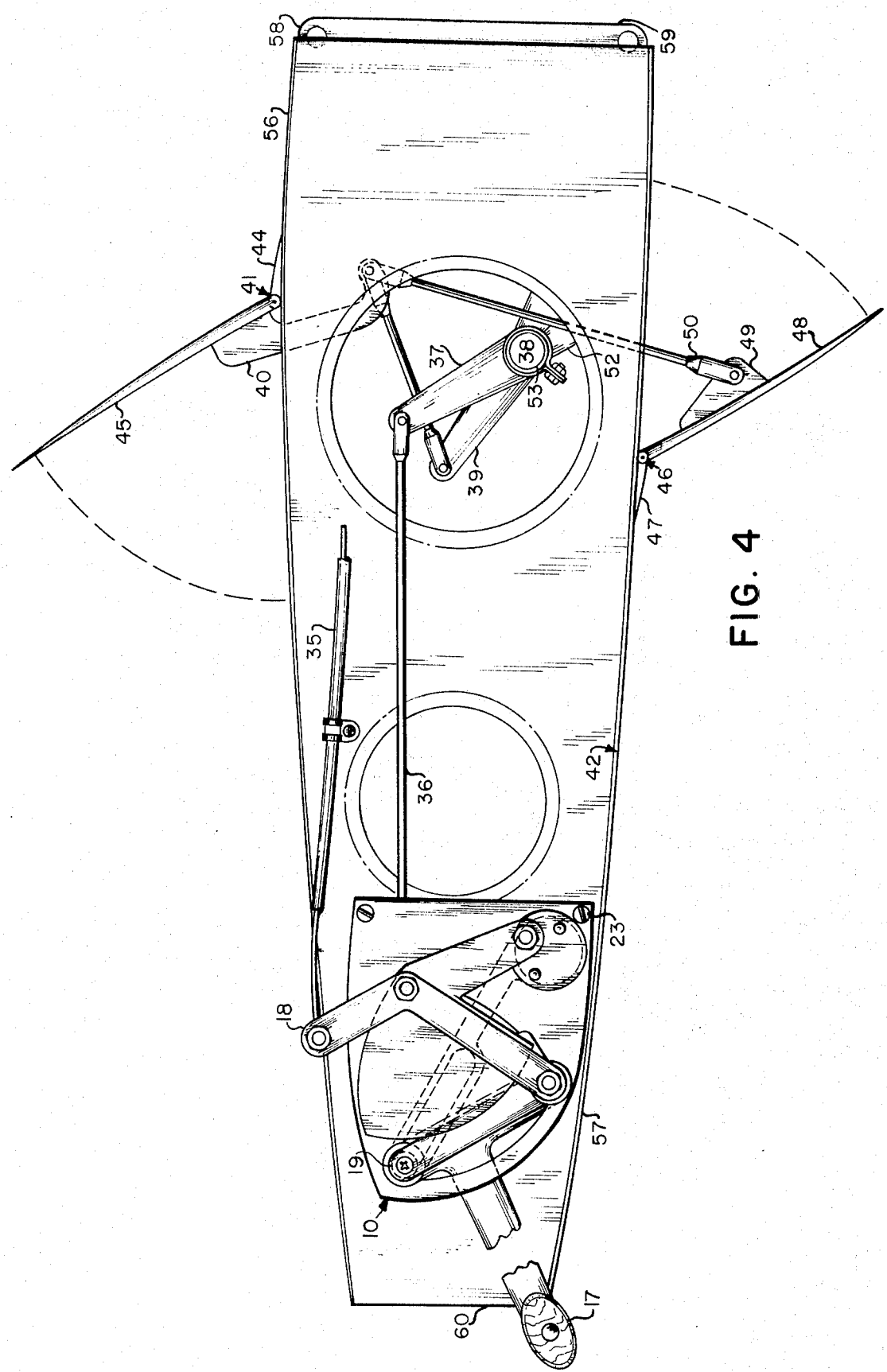
FIG. 4 is a mock-up or composite view of the device as mounted in an aircraft presenting a schematic or fragmented illustration of the control mechanism of this device in combination with the throttle, spoiler, and dive brake control linkages.

Normally mounted forward of the structure heretofore described as internal components within the airfoil would be spoiler push-pull rod 36 secured to spoiler drive arm 37 which is mounted on torque tube 38. Through this tube 38, spoiler arm 39 is rotated driving spoiler crank 40. This crank 40 is mounted on the under surface of the spoiler flap 45 which is a component of spoiler mechanism 41 mounted in the upper surface of wing 42. Spoiler structure 41 comprises a spoiler hinge 44 which is secured to the wing 42 and a spoiler flap 45. Mounted in the under surface of wing 42 substantially opposite spoiler mechanism 41 is dive brake 46. This brake 46 is secured to the wing by dive brake hinge 47 and comprises dive brake flap 48. Secured to dive brake flap 48 is dive brake crank 49 which is pivotally interconnected to spoiler arm 39 by means of spoiler brake linkage 50. Secured to the internal structure of the wing would be torque tube brackets 52 and torque tube bearings 53 in which torque tube 38 would be pivotally mounted. Schematically illustrated in FIG 4 is top of wing 56 and bottom of wing 57. It is visualized that the spoiler 41, dive brake 46 structure would be mounted in the rear of main wing spar 58. In the pre-ferred embodiment, it is visualized that the spoiler 41 and dive brake 56 would be mounted on the aircraft after the main spar 56 approximately mid-point between the leading edge 59 and the trailing edge 60 of the wing. The preferred position is indicated to be slightly nearer the trailing edge 60. However, on certain air foils, a position forward of the mid-point may be desirable.

OPERATION

The structure described, as well as utilization of this invention, may be rearranged or even modified by elimination of components while still retaining an operable structure. Various practical uses will be apparent upon consideration of the operation of the device. Take-off of the aircraft would be accomplished with actuator handle 17 in the extreme forward position. This position retracts spoiler 41 and dive brake 46 into the airfoil of wing 42, and full throttle is applied to the engine (not shown). When the aircraft is placed in a configuration for maximum power, lift, and speed and on take-off, throttle cam follower 30 would be placed adjacent throttle on detent 27 resulting in a maximum forward movement of throttle attach point 18. In flying the aircraft in the approach for landing, actuator handle 17 is moved to the rear. As the actuator handle 17 is moved approximately 45° to the rear, throttle cam follower 30 is placed adjacent throttle retard detent 29. As cam follower 30 slips into the recess of detent 29, a further movement to the rear of actuator handle 17 results in spoiler cam follower 31 moving along the surface of spoiler cam 21 gradually retracting spoiler push-pull rod 36 deploying the spoilers 41 and the dire brake 46. Simultaneously with the foregoing movement, idle arm 14 moves to spoiler open detent 28. The rotation and movement of idle arm 14, idle pivot 25 in conjunction with the movement of idle plate 15 further pivots throttle arm 12 and throttle attach point 18 to the rear retracting throttle cable 35 placing the aircraft and spoiler 41 and dive brake 46 full deployed, the lift of the wing 42 is reduced to minimum. Should the rate of descent exceed that desired, an advancing of actuator handle 17 forward would progressively retract spoilers 41 and dive brake 46 simultaneously with advancing throttle cable 35 and consequently applying more power to the engine. After the aircraft contacts the runway and a landing has been made, the actuator handle 17 is moved to the rear to a position of maximum deployment of spoiler 41 and dive brake 46. In this position, spoiler cam follower 31 is adjacent spoiler detent 28 and throttle cam follower 30 is adjacent throttle retard detent 29. Further movement to the rear or down of actuator handle 17 results in a movement of throttle cam follower 30 along the surface of taxi throttle cam 22 moving taxi arm 16 forward advancing throttle attach point 18. This limited movement through throttle cable 35 advances the throttle of the engine to a fast taxi rate.

It is visualized that the equilateral triangular cam-like structure with associated operating linkage is particularly adapted for the combined throttle spoiler actuator for an aircraft. It is visualized that this linkage might very well be utilized in other combined functions coodinating the total application of two functions. The device of this invention is in effect a coordinated progressive proportional linkage for controlling simultaneously two or more applications of control functions.

What is desired to be claimed is primarily a throttle spoiler actuator as defined in the appended claims. It is also desired to be claimed as a sub-combination equilateral triangular-like cam structure with associated followers and linkage as more specifically defined in the appended claims.

I claim:

1. A combined throttle-spoiler actuator for aircraft comprising:
   a. an equilateral triangular shaped control cam, said control cam further comprising:

1. a first cam surface constructed on a constant radius from a first corner of said equilateral triangular control cam,
2. a second cam surface constructed on a constant radius from a second corner of said equilateral triangular control cam, and
3. a third control cam surface constructed on a constant radius from a third corner of said equilateral triangular control cam, b. an operating handle tiltably movable mounted adjacent said control cam, c. a first cam follower moving responsive to movements of said handle, said follower operably contacting one of the cam surfaces and adapted to move along the cam surface of the said control cam, d. a second cam follower moving responsive to movement of said handle, said follower operably contacting one of the cam surfaces and adapted to move along the cam surface of said control cam, e. a first output means secured to said handle coordinatingly moving responsive to movement of said first cam follower, f. a second output means secured to said handle and coordinatingly moving responsive to movement of said second cam follower, and g. mounting means for securing said combination in a selected position.

2. The invention of claim 1 wherein said first output means is
   a. a throttle and wherein said second output means is
   b. a spoiler.

3. The invention of claim 1 further comprising an idle arm tiltably, eccentrically mounted on said cam for progressive movement at a high mechanical advantage for controlling said throttle at a retarded throttle mode of operation.

4. The invention of claim 1 including:
   a. a push-pull rod means secured to one of said output means,
   b. a spoiler linkage attached to and moving responsive to said push-pull rod means, and
   c. a spoiler deploying and retracting responsive to movement of said spoiler linkage.

5. The invention of claim 4 including a dive brake linked to and moving in a coordinated manner with said spoiler.

6. A multiple surface, multiple control cam producing mixed multiple outputs comprising:
   a. an equilateral triangular shaped control cam,
   b. a first cam surface constructed in said control cam, defining a first side of said equilateral triangle,
   c. a second surface constructed in said control cam, defining a second side of said equilateral triangle,
   d. a third control cam surface adjacent and in continuation of said second cam surface, said third cam surface substantially defining a third side of said equilateral triangle, said third cam surface adapted to receive and control said second cam follower wherein said third control cam surface constitutes a taxi throttle cam,
   e. tiltable arm means mounted adjacent said control cam,
   f. a handle secured to said tiltable arm means,
   g. a first cam follower secured to said arm, said first cam follower mounted in contact with and moving along said first cam surface responsive to movement of said arm,
   h. a second cam follower secured to said arm, said second cam follower mounted in contact with and moving along said second cam surface responsive to movement of said arm,
   i. a first output control means attached to said handle at a point adjacent said first cam follower, and
   j. a second output control means attached to said handle at a point adjacent said second cam follower.

7. The invention of claim 6 including a throttle arm mounted on said control cam opposite said tiltable arm means.

8. The invention of claim 6 including an idle plate mounted on said control cam opposite said tiltable arm means.

9. The invention of claim 6 including an idle arm tiltably eccentrically mounted on said multiple control cam adjacent said tiltable arm.

10. The invention of claim 6 wherein the first cam surface is a throttle cam and the second cam surface is a spoiler cam.

* * * * *